(12) United States Patent
Haley

(10) Patent No.: US 6,950,831 B2
(45) Date of Patent: Sep. 27, 2005

(54) PROCESSING SYSTEM FOR USE WITH A USER INTERFACE DISPLAY

(75) Inventor: John D. Haley, Honey Brook, PA (US)

(73) Assignee: Siemens Medical Solutions Health Services Corporation, Malvern, PA (US)

(*) Notice: Subject to any disclaimer, the term of this patent is extended or adjusted under 35 U.S.C. 154(b) by 527 days.

(21) Appl. No.: 10/101,343

(22) Filed: Mar. 19, 2002

(65) Prior Publication Data
US 2003/0007009 A1 Jan. 9, 2003

Related U.S. Application Data
(60) Provisional application No. 60/278,280, filed on Mar. 23, 2001.

(51) Int. Cl.[7] ............................................. G06F 17/30
(52) U.S. Cl. .................... 707/104.1; 707/101; 707/203; 345/762
(58) Field of Search ................................ 707/100–102, 707/104.1, 200–205; 345/762, 764; 715/505–508

(56) References Cited

U.S. PATENT DOCUMENTS

| | | | |
|---|---|---|---|
| 5,430,836 A | | 7/1995 | Wolf et al. ................... 345/744 |
| 5,438,659 A | | 8/1995 | Notess et al. ................ 707/505 |
| 5,555,365 A | | 9/1996 | Selby et al. ................. 345/765 |
| 5,682,535 A | | 10/1997 | Knudsen ...................... 717/117 |
| 5,761,656 A | | 6/1998 | Ben-Shachar .................. 707/4 |
| 5,784,562 A | * | 7/1998 | Diener ........................ 709/217 |
| 5,794,259 A | * | 8/1998 | Kikinis ....................... 715/507 |
| 5,832,532 A | | 11/1998 | Kennedy et al. ............. 707/503 |
| 5,872,973 A | | 2/1999 | Mitchell et al. ............. 709/332 |
| 5,901,313 A | | 5/1999 | Wolf et al. .................. 709/328 |
| 5,913,029 A | | 6/1999 | Shostak ....................... 709/203 |
| 5,937,155 A | | 8/1999 | Kennedy et al. ............... 714/38 |
| 5,940,075 A | | 8/1999 | Mutschler, III et al. ..... 345/760 |
| 5,960,441 A | | 9/1999 | Bland et al. ............... 707/104.1 |
| 6,014,677 A | | 1/2000 | Hayashi et al. ........... 707/104.1 |
| 6,023,271 A | | 2/2000 | Quaeler-Bock et al. ..... 345/866 |
| 6,122,627 A | | 9/2000 | Carey et al. ................... 707/4 |
| 6,134,540 A | | 10/2000 | Carey et al. ................... 707/2 |
| 6,138,170 A | | 10/2000 | Matheson ................... 709/318 |
| 6,167,523 A | * | 12/2000 | Strong ........................ 713/201 |
| 6,192,381 B1 | * | 2/2001 | Stiegemeier et al. ........ 715/505 |
| 6,330,006 B1 | * | 12/2001 | Goodisman ................. 715/762 |
| 6,457,009 B1 | * | 9/2002 | Bollay ......................... 707/10 |
| 6,460,042 B1 | * | 10/2002 | Hitchcock et al. ............ 707/10 |
| 6,526,426 B1 | * | 2/2003 | Lakritz ....................... 715/536 |
| 6,792,607 B1 | * | 9/2004 | Burd et al. ................. 719/316 |
| 2001/0027439 A1 | * | 10/2001 | Holtzman et al. | |
| 2001/0045963 A1 | | 11/2001 | Marcos et al. ............... 345/765 |

FOREIGN PATENT DOCUMENTS

WO    WO 01/44932 A1    6/2001

OTHER PUBLICATIONS

Dobson R: "Data Binding in Dynamic HTML Microsoft's DHTML Extensions Offload forms and Data Management IntoBrowsers," DBMS, M&T Publ. Redwood City, CA, US, vol. 11, No. 3, Mar. 1998, pp. 47–48, 50–52, XP008001408
International Search Report.

* cited by examiner

Primary Examiner—Greta Robinson
Assistant Examiner—Debbie M Le
(74) Attorney, Agent, or Firm—Alexander J. Burke

(57) ABSTRACT

A processing system, for use with a user interface display including image elements for prompting user data entry, includes a binding database. The binding database includes elements for linking different first and second data item identifiers with corresponding different first and second prompt elements of a user interface display image. The first data item identifier identifies a set of allowable data items for entry by a user via the first prompt element. A database parser automatically examines the binding database to detect a change in binding database elements. A processor updates the set of allowable data items in response to any detected binding database change.

19 Claims, 30 Drawing Sheets

Figure 3

BINDING TABLE
13

|    | Prompt element |    | Control Type |    | Data Item Identifier |    |
|----|----------------|----|--------------|----|----------------------|----|
| 29 | ctlLastName    | 14 | InputBox     | 24 | /Person/Name/familyName | 19 |
|    | ctlFirstName   | 15 | InputBox     | 25 | /Person/Name/givenName | 20 |
| 32 | ctlDegree      | 16 | ReadOnly     | 26 | /Person/Education/highestDegree | 21 |
|    | ctlBirthDate   |    | Calendar     |    | /Patient/birthdate   |    |
| 30 | ctlVIP         | 17 | ComboBox     | 27 | /AllowableValues/VIPStatuses | 22 |
| 31 | ctlVIP         | 17 | ComboBox     | 28 | /Patient/VIPStatus   | 23 |

Figure 4

DATA CONSTRAINTS TABLE

40

| EVALUATION TIME | DATA ITEM IDENTIFIER 39 | ACTION | 38 |
|---|---|---|---|
| INIT | /Patient/VIPStatus | SetAsRequired | 36 |
| INIT | /Patient/VIPStatus | setList ("1', "True", "0", "False" ) | 37 |

Figure 6

DATA CONSTRAINTS FOR ALTERED DATA

| EVALUATION TIME | INPUT DATA ITEM(S) PARTICIPATING IN THE CONDITION 43 | DATA ITEM IDENTIFIER 42 | CONDITION 45 | ACTION 44 |
|---|---|---|---|---|
| ON_CHANGE | /Patient/Sex | /Patient/PapTestDate | Equals(/Patient/Sex,"F") | SetAs Required |
| ON_CHANGE | /Patient/Sex | /Patient/PapTestDate | Equals(/Patient/Sex,"M") | SetAsNot Inactive |

Figure 7

```
1200 // ------------------------------------------------------------
1201 // Execute a Dynamic Validation for a control
1203 // ------------------------------------------------------------

1204 function AdaptBOHelper_controlChange (ctl)
1205 {
1206    // this function examines the data runtime for ondatachange validations for the selected control 1207    var dvElement = AdaptBOHelper_getDynamicValidationsElement ()

1208    if (dvElement == null)
1209       return true;   // nothing to check, so nothing failed 1210    var l = dvElement.childNodes.length;
1211    for (var i = 0; i < l; i++)
1212    {
1213       var thisElement = dvElement.childNodes.item(i);

1214       if (thisElement.getAttribute("RunWhen") != "ONDATACHANGE")
1215          continue;

1216       if (AdaptBOHelper_getAppliesTo(thisElement) != ctl.TntDataSource)
1217          continue;

1218       var rc = AdaptBOHelper_executeOneOnDataChange(thisElement, ctl);
1219       if (rc == false)
1220          return false;
1221    }

1222    // if this point is reached, all the validations have been passed
1223       return true;
1224 } // end function 1225 function AdaptBOHelper_executeOneOnDataChange (validationElement, ctl)
1226 {
1227    // this function executes one ondatachange dynamic validation
1228    var fn = new Function("ctl", validationElement.text);
1229    var rc = fn(ctl);
1230    return rc;
1231 } // end function
```

Figure 9

```
100 <HTML>
101 <HEAD>
102 <script defer src="HTML/SCRIPT/SubsetOfBinding.js"></script>

103 <TITLE>Patient Demographics Form</TITLE>
104 </HEAD>
105 <BODY ID=PatientDemographicsForm onload="onWindowLoad();">
106 <xml id=xmlForm></xml>

107 <SPAN TITLE="" STYLE="width:100%;" CLASS=field-label>Street:</SPAN>
108 <TEXTAREA TntTag=TextArea ID=ctlStreet TITLE="" CLASS=field TABINDEX=11 STYLE="width:100%;"
     TntReadOnly="false"></TEXTAREA>

109 <SPAN TITLE="" STYLE="width:100%;display:none;" CLASS=field-label>Address:</SPAN>
110 <TEXTAREA TntTag=TextArea ID=ctlAddress TITLE="" CLASS=field TABINDEX=12
     STYLE="width:100%;display:none;"TntReadOnly="false"></TEXTAREA>

111 <SPAN TITLE="" STYLE="width:100%;" CLASS=field-label>Zip code:</SPAN>
112 <INPUT TntTag=InputBox ID=ctlZipCode TYPE=textbox onafterchange="ctlZipCode_onafterchange(this);"
     onchange="ctlZipCode_onchange(this);"></INPUT>

113 <SPAN TITLE="" STYLE="width:45 %;" CLASS=field-label>State:</SPAN>
114 <SELECT TntTag=DataListBox ID=ctlState TntDataTarget="/Patient/stateCode"
     OptionValueDataSrc="stateCode" OptionTextDataSrc="stateCode/description"
     SelectElementByOID="true"></SELECT>

115 <SPAN ID=label_ctlCity TITLE="" STYLE="width:100%;" CLASS=field-label>City:</SPAN>
116 <INPUT TntTag=InputBox ID=ctlCity TYPE=textbox TITLE="" CLASS=field TABINDEX=14
     STYLE="width:100%;" TntReadOnly="false"></INPUT>

117 </BODY>
118 <SCRIPT>
119 // ------------------- Global Variables ------------
120 // Global Control Binding Reference Table
121 var g_ControlReferenceTable = new Array();
122 g_ControlReferenceTable["ctlStreet"] = new
     Array("TextArea","/Patient/currentAddress","/Patient/currentAddress/streetAddressText",11,ctlStreet);
123 g_ControlReferenceTable["ctlAddress"] = new
     Array("TextArea","/Patient/currentAddress","/Patient/currentAddress/streetAddressText",11,ctlAddress);
124 g_ControlReferenceTable["ctlZipCode"] = new
     Array("InputBox","/Patient/currentAddress","/Patient/currentAddress/zipCode",12,ctlZipCode);
125 g_ControlReferenceTable["ctlState"] = new
     Array("DataComboBox","/Patient/currentAddress","/Patient/currentAddress/stateCode/description",12,ctlSt
     ate);
126 g_ControlReferenceTable["ctlCity"] = new
     Array("InputBox","/Patient/currentAddress","/Patient/currentAddress/cityName",11,ctlCity);
```

Figure 10A

```
127 // -------------------- Window event handlers -------------
128 function onWindowLoad()
129 {

130 // get the XML data stream from a server
131 xmlIn = getXMLFromServer();

132 // load the XML into the xml document (tag) with ID=xmlForm
133 xmlForm.loadXML (xmlIn);

134   // bind the UI controls with the XML data - function in SmsTntBinding.js (figure 12)
135   moveXmlForAll();
136 }

137 // -------------------- Control event handlers -------------

138 function ctlStreet.onchange()
139 {
140 // INITIAL
141 var control = window.event.srcElement;

142 // DYNAMIC CONSTRAINTS - if fails abort bind
143 if(!AdaptBOHelper_controlChange(control))
144    return;

145 // BIND
146 TextArea_UI_TO_XML (control);
147 }
```

Fig. 10B

```
148  function ctlAddress.onchange()
149  {
150  // INITIAL
151  var control = window.event.srcElement;

152  // BIND
     TextArea_UI_TO_XML (control);
153  }

154  function ctlZipCode.onchange()
155  {
156  // INITIAL
157  var control = window.event.srcElement;

158  // DYNAMIC CONSTRAINTS - if fails abort bind
159  if(!AdaptBOHelper_controlChange(control))
160      return;

161  // BIND
162  InputBox_UI_TO_XML (control);

163  ctlZipCode_onafterchange(control);
164  }

165  function ctlZipCode_onafterchange (control)
166  {

167  // CUSTOM - Custom User Script executes after binding occurs
168  // Call application server to lookup City from ZipCode with
169  // LoadXMLWithCityFromZip function (not illustrated)
170  inputXMLLocation = "/Patient/currentAddress/zipCode";
171  outputXMLLocation = "/Patient/currentAddress/City";
172  LoadXMLWithCityFromZip(getValue(inputXMLLocation),outputXMLLocation);

173  // PARTIAL REBIND
174  affectedControls = UiBinding_GetControlsBoundToNodePath(outputXMLLocation);
175  for (var j=0; j<affectedControls.length; j++)
176      UiBinding_moveXMLDataToUi(affectedControls[j]);
177  }
```

Fig. 10C

```
178 function ctlCity.onchange()
179 {
180  // INITIAL
181  var control = window.event.srcElement;

182  // CUSTOM - do custom validations here
183  if passMyValidation(control) == false
184      return;  //abort buffer updating (bind)

185  // DYNAMIC CONSTRAINTS - if fails abort bind
186  if(!AdaptBOHelper_controlChange(control))
187      return;

188  // BIND
189  InputBox_UI_TO_XML (control);
190 }

191 </SCRIPT>
192</HTML>
```

Figure 10D

```
200 -<serialization>
201 -<DynamicValidations>
202   -<Validation AppliesTo="/Patient/currentAddress/zipCode"
203    RunWhen="ONINIT">
204      <![CDATA[setFieldRequired(nodePath);]]>
205   </Validation>
206   -<Validation AppliesTo="/Patient/activeIdentifiers/element/identifierType"
207    RunWhen="ONINIT">
208      <![CDATA[setListElements(nodePath, '<SmsTntCodedValue
209          ClassName="com.sms.tnt.allowablevalues.SmsTntCodedValue"                     2102
       OID="System.en_US.16.0"><description></description><crossRefCode></crossRefCode><behaviorCo
       de>0</behaviorCode><mnemonic></mnemonic></SmsTntCodedValue>', '', '<SmsTntCodedValue
       ClassName="com.sms.tnt.allowablevalues.SmsTntCodedValue"
         OID="SmsDef.Tnt.AllowableValues.en_US.16.13"><description>Donor
           Registration</description><crossRefCode>null</crossRefCode><behaviorCode>13</behaviorCode><
       mnemonic>DR</mnemonic></SmsTntCodedValue>', "Donor Registration", '<SmsTntCodedValue
         ClassName="com.sms.tnt.allowablevalues.SmsTntCodedValue"
       OID="SmsDef.Tnt.AllowableValues.en_US.16.2"><description>Drivers
           License</description><crossRefCode>null</crossRefCode><behaviorCode>2</behaviorCode><mnem
       onic>DL</mnemonic></SmsTntCodedValue>', "Drivers License", '<SmsTntCodedValue
           ClassName="com.sms.tnt.allowablevalues.SmsTntCodedValue"
       OID="SmsDef.Tnt.AllowableValues.en_US.16.5"><description>Medical Record
           Number</description><crossRefCode>null</crossRefCode><behaviorCode>5</behaviorCode><mnem
       onic>MR</mnemonic></SmsTntCodedValue>', "Medical Record Number", '<SmsTntCodedValue
           ClassName="com.sms.tnt.allowablevalues.SmsTntCodedValue"
       OID="SmsDef.Tnt.AllowableValues.en_US.16.28"><description>National Person
           ID</description><crossRefCode>null</crossRefCode><behaviorCode>28</behaviorCode><mnemonic
       >NN</mnemonic></SmsTntCodedValue>', "National Person ID", '<SmsTntCodedValue
           ClassName="com.sms.tnt.allowablevalues.SmsTntCodedValue"
       OID="SmsDef.Tnt.AllowableValues.en_US.16.15"><description>National Unique Individual
           ID</description><crossRefCode>null</crossRefCode><behaviorCode>15</behaviorCode><mnemonic
       >NI</mnemonic></SmsTntCodedValue>', "National Unique Individual ID", '<SmsTntCodedValue
210    ClassName="com.sms.tnt.allowablevalues.SmsTntCodedValue"
```

Figure 11A

211 OID="SmsDef.Tnt.AllowableValues.en_US.16.14"><description>Person
Number</description><crossRefCode>null</crossRefCode><behaviorCode>14</behaviorCode><mne
monic>PN</mnemonic></SmsTntCodedValue>', "Person Number", '<SmsTntCodedValue
ClassName="com.sms.tnt.allowablevalues.SmsTntCodedValue"
OID="SmsDef.Tnt.AllowableValues.en_US.16.16"><description>Railroad Retirement
Number</description><crossRefCode>null</crossRefCode><behaviorCode>16</behaviorCod
e><mnemonic>RR</mnemonic></SmsTntCodedValue>', "Railroad Retirement Number",
'<SmsTntCodedValue
ClassName="com.sms.tnt.allowablevalues.SmsTntCodedValue"
OID="SmsDef.Tnt.AllowableValues.en_US.16.10"><description>Social Security
Number</description><crossRefCode>null</crossRefCode><behaviorCode>10</behaviorCod
e><mnemonic>SS</mnemonic></SmsTntCodedValue>', "Social Security Number",
'<SmsTntCodedValue
ClassName="com.sms.tnt.allowablevalues.SmsTntCodedValue"
OID="SmsDef.Tnt.AllowableValues.en_US.16.17"><description>WIC
Number</description><crossRefCode>null</crossRefCode><behaviorCode>17</behaviorCod
e><mnemonic>WC</mnemonic></SmsTntCodedValue>     ', "WIC Number");]]>
212     </Validation>
213     </DynamicValidations>
214 -<Patient ClassName="com.core.ptmgmt.SmsTtnPatient"
215     OID="44946832753169" SmsTntObjectDirtyFlag="Update">
216 -<currentAddress ClassName="com.admin.SmsTtnPersonAddressUsage"
217     OID="935504006611766" SmsTntObjectDirtyFlag="Query">
218     <cityName>Malvern</cityName>
219     <countryName>USA</countryName>
220     <streetAddressText>1227 AnyStreet Dr.</streetAddressText>
222     <zipCode>19355</zipCode>
223     </currentAddress>
224 </Patient>
225 </serialization>

Figure 11B

```
300 // ----------------------------------------------------------------
301 // Bind XML to all the controls
302 // ----------------------------------------------------------------

303 function moveXmlForAll()
304 {

305    // Call bind on every element in the g_ControlReferenceTable array,
306    // assuming that UI Generator included all elements that are to be bound.

307    for (x in g_ControlReferenceTable)
308    {
309        moveXmlForControl (g_ControlReferenceTable[x][4]);
310    }
311 }
```

Figure 12

```
312 // ----------------------------------------------------------------
313 // Bind XML to one control
314 // ----------------------------------------------------------------
315 function moveXmlForControl (ctl)
316 {
317     var controlTntTag = g_ControlReferenceTable[ctl.id][0];
318     // for performance reasons explicitly call the functions for each of the control types
319     if ( controlTntTag == "InputBox" )
320         InputBox_XML_TO_UI(ctl);        //see function declared below
321     else if ( controlTntTag == "DataComboBox" )
322         DataComboBox_XML_TO_UI(ctl);    //see function declared below
323     else if ( controlTntTag == "ReadOnly" )
324         ReadOnly_XML_TO_UI(ctl);
325     else if ( controlTntTag == "TextArea" )
326         TextArea_XML_TO_UI(ctl);
327     else if ( controlTntTag == "Grid" )
328             Grid_XML_TO_UI(ctl);

329             //... more control types go here - removed for brevity

330     // Set the label text color for the control based on whether the control is disabled
331     // or not. The label is assumed to have the same name as the control but with a "label_"
332     // prefix.
333     var lbl = "document.all.label_" + ctl.id;
334     var aTemp = document.all("label_" + ctl.id);
```

Figure 13A

```
335  if (typeof(ctl.tagName) != "undefined")
336  {
337     var bDisabled = false;
338     var bTntDisabled = false;

339     if (typeof(ctl.disabled) != "undefined")
340             bDisabled = ctl.disabled;

341     if (typeof(ctl.TntDisabled) != "undefined")
342             //Note - controls generally set TntDisabled to "true" and "false"
343             // but the combo box is sets this to "YES". The combo box will be changed
344             // to work like the other controls but that's why the following condition
345             // makes a comparison to "YES" for now.
346             if (ctl.TntDisabled == "true" || ctl.TntDisabled == "YES")
347                     bTntDisabled = true;
348             else
349                     bTntDisabled = false;

350     if (bDisabled||bTntDisabled)     // ctl.TntDisabled is only defined for ComboBox.
351                     //As IPS ComboBox is inside of <SPAN>. <SPAN> does
352                     //not support 354"disabled" as its attribute. cxwang
353             {
354                     __TntCommon_DisableControl(ctl, true);
355             } // end if
356     else
357             {
358                     __TntCommon_DisableControl(ctl, false);
359             } // end else 360  } // end outer if
361 } // end function
```

Figure 13B

```
400 // ----------------------------------------------------------------
401 // EXAMPLE OF BINDING ROUTINES FOR A CONTROL -INPUTBOX
402 // ----------------------------------------------------------------

403 function InputBox_XML_TO_UI (ctl)
404 {
405   keyId = ctl.id;
406   var TntRelDataSource = getRelativeDataSource (keyId);
407   var TntAbsDataSource = getAbsoluteDataSource (keyId);

408   ctl.value = "";

409   if (TntRelDataSource != "")
410            ctl.value = s;
411   }
412 }

413 function InputBox_UI_TO_XML (ctl)
414 {
415   keyId = ctl.id;
416   var TntRelDataSource = getRelativeDataSource (keyId);
417   var TntAbsDataSource = getAbsoluteDataSource (keyId);

418   var value = TrimVal(ctl.value);

419   if (TntRelDataSource != "")
420      setValue(TntAbsDataSource, value);

```
500 // --------------------------------------------------------------------
501 // EXAMPLE OF BINDING ROUTINES FOR A CONTROL -DATALIST/DATACOMBOBOX
502 // --------------------------------------------------------------------

503 function DataComboBox_XML_TO_UI(ctl)
504 {

505   // if control is in grid don't bind it because the grid will take care of this
506   if ( ctl.isInGrid == "true" )
507     return;

508   keyId = ctl.id;
509   var TntRelDataSource = getRelativeDataSource (keyId);
510   var TntStartDataSource = getStartDataSource (keyId);
511   var TntAbsDataSource = getAbsoluteDataSource (keyId);

512   var StartDataRef = null;
513   var s = "";

514   // clear the listbox (assign the length to a variable because it doesn't work inline)
515     var limit = ctl.options.length;

516   for (var j = 0; j < limit; j++)
517     // always remove the topmost element (i.e., element 0) since the collection is contracting
518     ctl.options.remove(0);

519   nodeElem = xmlForm.documentElement.selectSingleNode (TntAbsDataSource);
520   if (!nodeElem) //No data
521     return;
522
523
```

Figure 15A

```
524 // if optionValueDataSrc was specified, build an XQL string for element 0 and
525 // then try to get a reference to that node to be used as a flag (later in this routine).
526 var valueNode = xmlForm.documentElement.selectSingleNode(TntAbsDataSource + "[0]/" +
    ctl.OptionValueDataSrc);
527 var isValidValueDataSource = (valueNode != null);

528 // Define DataSource for the Table control
529 var dataSource = TntAbsDataSource.slice(0, TntAbsDataSource.lastIndexOf("/"));

530  // find the source list
531 nodeList = xmlForm.documentElement.selectSingleNode (dataSource);

532 // get number of records in the List Recordset
533 var listCount = nodeList.childNodes.length;

534 if (listCount == 0)
535     return;

536 var nodeRecord = nodeList.childNodes(0);

537 //Check for the special case that the list is just one empty (placeholder) item
538 if (listCount == 1 && nodeRecord.getAttribute ("IsPlaceHolder") != null)
539 {
540     //if AddNullElement option make it's value a nullObject Placeholder
541     if (typeof(ctl.AddNullElement) != "undefined")
542     {
543         if (!ctl.OptionValueDataSrc)   //if value is entire list element
544             nodeField = nodeRecord;
545         else                                          //else an object within the element
546             nodeField = nodeRecord.selectSingleNode (ctl.OptionValueDataSrc);
547         nodeField.setAttribute ("IsNullObject", "1");
548         nodeField.setAttribute ("IsPlaceHolder", "1");
549     }
550     return;
551 }
```

Figure 15B

```
552   else      //if AddNullElement option and a NullObject element does not already exist
553             //add a nullObject Placeholder element by cloning the 1st element
554   if        (       typeof(ctl.AddNullElement) != "undefined" &&
555                     (nodeList.selectSingleNode("element[@IsNullObject]") == null)
556             )
557   {
558             xmlGraft = new ActiveXObject ("Microsoft.XMLDOM");
559             xmlGraft.async = false;

560             xmlGraft.loadXML (nodeRecord.xml);
561             var elem = xmlGraft.documentElement;

562             //make desc blank
563             if (!ctl.OptionTextDataSrc)          //if a string (non-object)
564                     nodeField = elem;
565             else
566                     nodeField = elem.selectSingleNode (ctl.OptionTextDataSrc);
567             nodeField.text ="";

568             //set value to nullObject Placeholder
569             if (!ctl.OptionValueDataSrc)   //if value is entire list element
570                     nodeField = elem;
571             else                                                //else an object within the element
572                     nodeField = elem.selectSingleNode (ctl.OptionValueDataSrc);
573             nodeField.setAttribute ("IsNullObject", "1");
574             nodeField.setAttribute ("IsPlaceHolder", "1");
575             nodeField.removeAttribute ("OID");

576             nodeList.insertBefore(nodeField, nodeRecord);

577             xmlGraft = null;
578             listCount++;
579   }
```

Figure 15C

```
580    // loop through the XML document and add each element to the listbox
581    for (var i = 0; i < listCount; i++)
582    {
583        // get List Record
584        var nodeRecord = nodeList.childNodes(i);
585        var nodeField;

586        //get Field node
587        if (!ctl.OptionTextDataSrc)          //This allows binding to just a string (non-object)
588                nodeField = nodeRecord;
589        else
590                nodeField = nodeRecord.selectSingleNode (ctl.OptionTextDataSrc);

591        if (!nodeField)
592        {
593                ctl.disabled = true;
594                return;
595        }

596        if (nodeField.nodeType == NODE_TEXT)
597                var desc = nodeField.nodeValue;
598        else
599                var desc = nodeField.text;

600        if (isValidValueDataSource)      //if the Value Data Source is valid XQL    and it finds an element
601                var value = TntAbsDataSource + "[" + i + "]" + "/" + ctl.OptionValueDataSrc;
602        else    //just assume the entire element should be put in the list
603                var value = TntAbsDataSource + "[" + i + "]";
```

Figure 15D

```
604    // add each description to the listbox, programmatically
605    oOption = document.createElement("OPTION");
606    oOption.text = desc;
607    oOption.value = value;

608    ctl.add(oOption);
609  }

610  ctl.selectedIndex = -1;

611  //copy the list item to the TargetData attribute if it is defined and the element exists in the XML
612  if (typeof(ctl.TntDataTarget) != "undefined")
613  {
614      var TntDataTarget = ctl.TntDataTarget;
615      var absDataTarget = "";           //Absoulute data source used for XSL pattern query 616      if (ctl.TntDataTarget.slice(0,1) == "/")
617             absDataTarget = "." + ctl.TntDataTarget;
618      else
619             absDataTarget = "." + TntStartDataSource + "/" + TntDataTarget;

620      var matchOnOID = false; //flag which means to find and highlight DataTarget in list using OID
621      var node = xmlForm.documentElement.selectSingleNode (absDataTarget);
622      if (node != null)
623      {
624            //if data target is an object then assume it contains the same element as the list description data source
625            if (node.attributes.getNamedItem ("ClassName") != null)
626            {
627                   //look for the target object by searching for its OID in the list?
628                   if (typeof(ctl.SelectElementByOID) != "undefined")
629                   {
630                          if (ctl.SelectElementByOID == "true")
631                                 matchOnOID = true;
632                   }
633                   else
634                          matchOnOID = false;
```

Figure 15E

```
635             if (!matchOnOID)  //if not matching on OID assume it contains the same element as the
      list description data source
636             {
637                     //if we are using a valid Value Data Source    (this is an offset into repeating
      element)
638                     //so drop it off the front of the Value Source
639                     if (isValidValueDataSource)
640                             var ds = absDataTarget +
      (ctl.OptionTextDataSrc).substring((ctl.OptionValueDataSrc).length);
641                     else
642                             var ds = absDataTarget + "/" + ctl.OptionTextDataSrc;
643                     s = xmlForm.documentElement.selectSingleNode(ds).text;
644             }
645     }
646     else
647             s = node.text;
648 }

649 if (matchOnOID)
650 {
651     // find the object ID in the list - unless the object has no OID (placeholder today has no OID)

652     theTargetOID = node.getAttribute("OID");
653     if (theTargetOID != null)
654             for (var y = 0; y < ctl.length; y++)
655             {
                        e = xmlForm.documentElement.selectSingleNode(ctl.item(y).value);
656                     if (e.getAttribute("OID") == theTargetOID)       //compare to target OID
657                     {
658                             ctl.selectedIndex = y;
659                             break;
660                     }
661             }
662 }
663 else if (s != "")   //if there is a data target value
664 {
```

Figure 15F

```
665         // find option in the list
666         for (var y = 0; y < ctl.length; y++)
667         {
668             if (ctl.item(y).text == s)   //compare to description
669             {
670                 ctl.selectedIndex = y;
671                 break;
672             }
673         }
674     }
675 }

676 if (typeof(ctl.AlwaysOneSelected) != "undefined")
677 {
678     if (ctl.selectedIndex == -1)       //if none selected already then select first one
679     {
680         if (!g_AlwaysOneSelectedInProcess) //this will stop endless recursive loop if no match ever found
681         {
682             ctl.selectedIndex = 0;
683             g_AlwaysOneSelectedInProcess = true;
684             eval(ctl.id + "_onchange(ctl);");
685             g_AlwaysOneSelectedInProcess = false;
686         }
687     }
688 }

689 ListBox_InitialReadOnly(ctl);
690 }

691 function DataComboBox_UI_TO_XML (ctl)
692 {
693 keyId = ctl.id;
694 var TntRelDataSource = getRelativeDataSource (keyId);
695 var TntStartDataSource = getStartDataSource (keyId);
696 var TntAbsDataSource = getAbsoluteDataSource (keyId);
697 var absDataTarget = "";
698 var TntDataTarget = ctl.TntDataTarget;
```

Figure 15G

```
699  if (ctl.selectedIndex >= 0)
670  {
671      var listElementDataSource = TrimVal(ctl.item(ctl.selectedIndex).value);
672      var node = xmlForm.documentElement.selectSingleNode (listElementDataSource);

673      if ((typeof(TntDataTarget) != "undefined") && (node))
674      {
675          if (TntDataTarget.slice(0,1) != "/")
676              absDataTarget = "." + TntStartDataSource + "/" + TntDataTarget;
678          else
679              absDataTarget = "." + TntDataTarget;

680          var targetNode = xmlForm.documentElement.selectSingleNode (absDataTarget);
681          var txt = node.text;
682          var xml = node.xml;

683          var attrClass = targetNode.attributes.getNamedItem ("ClassName");

684          if (attrClass) //If it is a class, graft it.
685              graftXML (absDataTarget, xml);
686          else //If it is an attribute, set it.
687              setValue (absDataTarget, txt);
688      }
689  }
690  }
```

Figure 15H

```
700 // ----------------------------------------------------------------
701 // Given a relative XQL reference and a start element, sets the specified value
702 // into the XML element that the XQL resolves to.
703 // @param  startNode (optional)    the starting Element
704 // @param  xql    the xql reference
705 // @param  value   the value to set into the Element
706 // ----------------------------------------------------------------
707 function setValue (startNode, xql, value)
708 {

709   //If startNode is not passed in
710   if (arguments.length == 2)
711   {
712      value = arguments[1];
713      xql = arguments[0];
714      startNode = xmlForm.documentElement;
715   }

716   var e = startNode.selectSingleNode (xql);

717   if (e)
718   {
719      setAndDirty(e, value);
720      syncElementsBoundToSameInstanceAndProperty(e);
721   }
722 }
```

Figure 16

```
800 // ----------------------------------------------------------------
801 // Highlight a required field control
802 // ----------------------------------------------------------------

803 function setFieldRequired (nodePath)
804 {
805    // this function sets any controls bound to the specified XML element to be required 806    var boundControls = new Array();
807    boundControls = UiBinding_GetControlsBoundToNodePath(nodePath);

808    for (var i = 0; i < boundControls.length; i++)
809    {
810      if ((boundControls[i].TntTag != "ReadOnly")
811               && (boundControls[i].TntTag != "Grid"))
812         TntCommon_SetRequired(boundControls[i]);
813    }
814 }
```

Figure 17

```
900 // ----------------------------------------------------------------
901 // Determine which controls are pointing to a specific branch in the XML
902 // ----------------------------------------------------------------
903 function UiBinding_GetControlsBoundToNodePath (nodePath)
904 {
905    // this function walks the document.all collection, looking for elements with a
906    // TntDataSource property (or DataTarget in case of the DataList)
907    // equal to the passed-in XQL reference. Such controls are
908    // added to an array that is ultimately returned to the user.

909    var fullDataSource = "";
910    var a = new Array();
911    var nodePathWithDelim = nodePath + "/";
912    var dataSource;
913    var dataTarget;
914    var nonCodedValueObject = false;

915 // determine if the nodePath refers to an object that is not the special coded value object
916 var node = getElementIfExists(nodePath);
917     if (node)
918     {
919            nodeClass = node.attributes.getNamedItem ("ClassName");
920            if (nodeClass)
921                if (nodeClass.value.indexOf("CodedValue") == 0)
923                        nonCodedValueObject = true;
924     }
925 for (x in g_ControlReferenceTable)
926 {
927        dataSource = getAbsoluteDataSource(x) + "/";
928        dataTarget = "";
```

Figure 18A

```
929    // for the DataListBox and DataComboBox also use the data target
930    if (g_ControlReferenceTable[x][0] == "DataListBox" || g_ControlReferenceTable[x][0] == "DataComboBox")
931    {
932            dataTarget = g_ControlReferenceTable[x][4].TntDataTarget;
933            if (typeof(dataTarget) == "undefined")
934                    dataTarget = "";
935    else
936                    dataTarget = "." + dataTarget + "/";
937    }

938    // if nodePath is an non-code value object then match exactly - not just left most part of datasource
939    if (!nonCodedValueObject)
940    {
941            // skip over the initial dot
942            dataSource = dataSource.substr(1, nodePathWithDelim.length);
943            dataTarget = dataTarget.substr(1, nodePathWithDelim.length);
944    }

945    if (nodePathWithDelim == dataSource || nodePathWithDelim == dataTarget)
        {
946        a[a.length] = g_ControlReferenceTable[x][4];
947        //jdh 5/23 allow it to find all controls - break;
948        }
949 }

950    return a;
951 }
```

Figure 18B

```
1000 // ----------------------------------------------------------------
1001 // Control highlighting
1002 // ----------------------------------------------------------------

1003 function TntCommon_SetRequired (ctl, setToRequired, isConditional)
1004    {

1005    var bSetToRequired;
1006    var bIsConditional;

1007    var ctlClassName;
1008    var ctlLabelClassName;

1009    // no control passed in? adios...
1010    if (typeof(ctl) == "undefined")
1011      return;

1012    // Can't set Grid and Readonly to "required"
1013    if ((ctl.TntTag == "ReadOnly") || (ctl.TntTag == "Grid"))
         return;

1014    // the setToRequired variable is optional so set
1015    // another variable that will be used further down.
1016    if (typeof(setToRequired) == "undefined")
         bSetToRequired = true;
1017    else
         bSetToRequired = setToRequired;

1018    // do the same with the isConditional parameter
1019    if (typeof(isConditional) == "undefined")
1020    bIsConditional = false;
1021    else
1022    bIsConditional = isConditional;
```

Figure 19A

```
1023  // set the class name variables based on whether
1024  // the control's appearance should be set to "required" or
1025  // "non-required".

1026  if (bSetToRequired)
1027  {
1028  ctlClassName = "required-field";
1029  ctlLabelClassName = "required-field-label";
1030  }
1031  else
1032  {
1033          ctlClassName = "field";
1034          ctlLabelClassName = "field-label";
1035  }

1036  // do the control
1037  if (ctl.TntObject == null)
1038  {
1039  ctl.className = ctlClassName;
1040
1041
1042  }
1043  else
1044  {
1045  ctl.TntObject.setRequired(bSetToRequired);
1046  }

1047  // do the label if it exists
1048  theLabel = document.all("label_" + ctl.id);
1049  if (theLabel != null)
1050  {
1051  theLabel.className = ctlLabelClassName;
1052  theLabel = null;
1053  }

1054  // don't do anything with the associated label if the caller
1055  // specified that this is conditionally required
1056  if (bIsConditional)
1057  return;

1058  setAssociatedLabelClass(ctl, ctlLabelClassName);
1059  }
```

Figure 19B

```
1100 // -----------------------------------------------------------------
1101 // Highlight the label for a required control
1102 // -----------------------------------------------------------------

1103 function __setAssociatedLabelClass(ctl, ctlLabelClassName)
1104 {
1105     var aLabel = ctl.getAttribute(ASSOCIATED_LABEL);
1106     if(aLabel != null)
1107     {
1108             var objLabel = document.all(aLabel);

1109             if(objLabel != null)
1110     {
1111             objLabel.className = ctlLabelClassName;
1112             objLabel = null;
1113     }

1114     aLabel = null;
1115 }
1116 }
```

Figure 20

PROCESSING SYSTEM FOR USE WITH A USER INTERFACE DISPLAY

This application is concurrently filed together with commonly owned related application, Ser. No. 10/100,867 filed 19 Mar. 2002.

The present application is a non-provisional application based on the provisional application Ser. No. 60/278,280 entitled "A User Interface Display Configuration and Data Processing System" and filed Mar. 23, 2001.

FIELD OF THE INVENTION

This invention pertains generally to a computer user interface display configuration and processing system, and more specifically to a nonprocedural method for interfacing data in a data buffer to event driven user interface controls.

BACKGROUND OF THE INVENTION

The description of forms to be displayed on internet browsers via the World Wide Web is typically accomplished by the use of Dynamic Hypertext Markup Language (DHTML). DHTML is a product of the Microsoft Corporation of Redmond, Wash. DHTML incorporates the concept of the Form as a means of presenting Graphical User Interface (GUI) controls for manipulation by the user. DHTML documents contain tags representing user interface devices, such as input text boxes etc., known as controls. The controls may initially be blank, or information may be placed in the controls when the form is initially displayed. The initial data for any of the controls is usually transmitted with the DHTML document along with the control tag. An example of a DHTML statement having an inputbox control with the data "19344" embedded in the tag might be written as:

<INPUT ID=ctlZipCode>19344</INPUT>

The user, in turn, may edit or enter new information into these controls. When the user is done, the contents of the GUI controls, is collected by the Web browser and forwarded as part of the Universal Resource Locator (URL) to the Web server in the form of control name/control value pairs.

Often, such forms are used to display and collect information related to a database. The database may contain tables, each table containing a collection of records, each record containing a collection of fields. When used in this manner, it is necessary to associate a control on the form with a corresponding piece of data in the database. Data binding refers to a software subroutine which associates data contained within a database with other information that is relevant to that data, including the data's location within the form, i.e. the control used to display and/or edit that data.

Currently, data binding relies on an architecture having four components, namely a data source object (DSO), data consumers, a binding agent and a table repetition agent. In order to bind database data to control elements present on an HTML page, a DSO, which represents the database, must exist on that page. To identify desired data within the database, the DSO requires selection information in some form. For example, the DSO may require an Open Database Connectivity (OBDC) string and a Structured Query Language (SQL) statement or only a Universal Resource Locator (URL). SQL is discussed in SQL—*The Complete Reference* by James R. Groff and Paul N. Weinberg, McGraw-Hill Professional Publishing (1999) ISBN 007-211-8458.

The data in the DSO may also be defined using Extensible Markup Language (XML). XML is discussed in *Essential XML: Beyond Markup* by Don Box, Aaron Skonnard and John Lam, Addison-Wesley Publishing Co. (2000) ISBN 020-170-9147. The XML DSO is a read only data provider. In order to use an XML DSO one must add a Java applet element to the HTML form page. Java is a product of Sun Microsystems, Inc of Palo. Alto, Calif. A param tag within the HTML form page specifies the location of the applet element. The XML DSO retrieves XML database data from a specified location, possibly from an external server computer via a network connection, parses the data, and provides the data to the bound control elements on the page. In this manner, the data consuming elements (the control elements) are isolated from the details of XML.

The Microsoft DHTML data binding software utilizes the Microsoft ActiveX Data Object (ADO) programming model which is discussed in *Understanding ActiveX and OLE* by David Chappell, published by the Microsoft Press, Redmond, Wash., ISBN 1-572-31216-5. The architecture of the existing state of the art, as practiced by Microsoft, is depicted in FIG. 1. The ADO programming model is a recordset model. The ADO recordset contains two components, namely a collection of Fields and a collection of Properties. Each record within an ADO recordset has a collection of Fields. The Fields collection is the default collection for an ADO recordset object. Each Field has a Name, Value and Count property. The Count property indicates the number of Fields in the collection. In the ADO recordset Properties collection each property has a Name, Type and Value. The ADO programming model permits only serial addressing of a record set, that is, only one record set at a time is accessible. One result of using the ADO protocol is that there is no practical method of binding one group of data control elements to more than one recordset object.

In the context of forms, a group of data control elements is a tabular grouping of data control elements that may be aligned either vertically and/or horizontally. A control element is defined as an element for display in a user interface display image, such as a form, questionnaire, web page, browser, spreadsheet, document or any other display, of data displayed for or entered by the user. The control element prompts a user to either make a selection or enter data. A desired presentation grouping of data, such as object oriented hierarchically arranged data, on a form can require data from several underlying recordset objects. The Microsoft ADO record set model does not integrate well with an object oriented hierarchical data buffer structure insofar as an HTML document builder must write code to manipulate multiple dataset objects, also called view objects, in order to bind the desired data to corresponding controls in the HTML form used for presentation formatting.

When an existing DHTML document is sent by a server to a client machine the document may already have embedded data. The client's web browser subsequently receives and displays whatever data is already contained in the server generated document. The user can then alter this displayed data. A form which has some of its data altered by the client user is returned to the server in its entirety when the user is finished. That is, both the data and the underlying form is retransmitted to the server. The repeated sending of redundant information between the server and client computers regarding a largely static form creates unnecessary network traffic.

Numerous examples of data binding protocols exist. U.S. Pat. No. 6,014,677, entitled DOCUMENT MANAGEMENT DEVICE AND METHOD FOR MANAGING DOCUMENTS BY UTILIZING ADDITIVE INFORMATION, issued to Hayashi et al. discloses a binding information creating device which associates a document with subsequent evaluation data based on earlier information contained within the document. A tag template is defined by an onscreen editor, and a tag template database is created to associate coinciding tags with the same document.

U.S. Pat. No. 5,940,075, entitled METHOD FOR EXTENDING THE HYPERTEXT MARKUP LANGUAGE (HTML) TO SUPPORT ENTERPRISE APPLICATION DATA BINDING, issued to Mutschler, III et al. discloses a web server program and associated database for storing description language of a form to be displayed. The server is coupled to a host having a CPU executing a legacy application containing the form. The server opens the form and associates data names with data values received from the host and sends them to the client.

U.S. Pat. No. 6,023,271, entitled FRAMEWORK FOR BINDING DATA VIEWERS/DATA MANIPULATION WITH ONE TO MANY OBJECTS THROUGH INTROSPECTION, issued to Quaeler-Bock et al., discloses a data structure that enables a client application to bind a set of GUI components to the attributes of at least one Business Object (BO).

U.S. Pat. No. 5,555,365, entitled METHOD AND SYSTEM FOR OPTIMIZING STATIC AND DYNAMIC BINDING OF PRESENTATION OBJECTS WITH THE OBJECT DATA THEY REPRESENT, issued to Selby et al. discloses the creation of a table that specifies relationships between GUI objects and the application object. Each time the application object is initialized the table is used to associate GUI objects to objects within the application object.

U.S. Pat. No. 5,430,836, entitled APPLICATION CONTROL MODEL FOR COMMON USER INTERFACE ACCESS, issued to Wolf et al., discloses an Application Control Module (ACM) that is executable by the applications. The ACM includes functional elements for initializing the data in the application, drawing or presenting a display screen defined by the data, running or processing user input events in accordance with the operation defined by the data, and closing the application.

U.S. Pat. No. 5,832,532, entitled MODEL INDEPENDENT AND INTERACTIVE REPORT GENERATION SYSTEM AND METHOD OF OPERATION, issued to Kennedy et al. discloses an interactive report generation system that includes a compiler, an evaluator, a renderer, and model interface functions. The compiler receives report, layout, and worksheet definitions, accesses model interface functions, and generates a report template. The evaluator receives the report template, accesses model interface functions, accesses a user model, and generates a report instance. A renderer receives the report instance in order to display and allow interaction with that report instance.

A presentation grouping of data on a form can originate from several underlying dataset objects. It is desirable that any desired control grouping should able to be achieved without the need to create additional view objects for each specific display arrangement. This would facilitate the use of business objects as they are defined in the application server without requiring the transformation of the data into an alternate buffer structure, or additional programming of view or dataset objects.

BRIEF SUMMARY OF THE INVENTION

In accordance with principles of the present invention, a processing system, for use with a user interface display including image elements for prompting user data entry, includes a binding database. The binding database includes elements for linking different first and second data item identifiers with corresponding different first and second prompt elements of a user interface display image. The first data item identifier identifies a set of allowable data items for entry by a user via the first prompt element. A database parser automatically examines the binding database to detect a change in binding database elements. A processor updates the set of allowable data items in response to any detected binding database change.

BRIEF DESCRIPTION OF THE DRAWING

In the drawing:

FIG. 3 is a pictorial representation of an exemplary form useful in understanding the operation of the present invention;

FIG. 4 is an example of a binding database table created according to the principles the present invention;

FIG. 6 is an example of a table depicting a first group of data constraints associated with a form according to the principles of the present invention;

FIG. 7 is an example of a table depicting a second group of data constraints associated with a form according to the principles of the present invention;

FIG. 9 is a JavaScript code listing that performs a dynamic validation of an image element;

FIGS. 10A, 10B, 10C and 10D, taken together, depict a sequential HTML code listing depicting the display of and processing of data in portions of the form depicted in FIG. 3;

FIGS. 11A and 11B, taken together, depict a sequential XML code listing that creates an XML document that is embedded in the HTML form depicted in FIG. 3;

FIG. 12 is a JavaScript code listing that will bind XML data items received from a server machine to specified controls appearing in the form depicted in FIG. 3 according to data description in the XML document of FIG. 11;

FIGS. 13A and 13B, taken together, depict a sequential JavaScript code listing that will bind an XML data item received from a server machine to one specified control appearing in the form depicted in FIG. 3 according to the data description in the XML document of FIG. 11;

FIG. 14 is a Javascript code listing of a binding routine that will exchange data received from a server machine with a control input box appearing in a form according to the data description in the XML document of FIG. 11;

FIGS. 15A, 15B, 15C, 15D, 15E, 15F, 15G and 15H, taken together, depict a sequential JavaScript code listing that will exchange XML data received from a server machine with a control such as a data list/combo box appearing in a form according to the data description in an XML document by populating the list from specified data items in the XML document and returning a user selection to a different data item in the XML document;

FIG. 16 depicts a JavaScript file listing that will insert a resolved XQL value into an XML element associated with a form;

FIG. 17 depicts a Javascript code listing that highlights those prompt elements in a form associated with a required XML element;

FIGS. 18A and 18B, taken together, depict a sequential Javascript code listing that determines which controls appearing in a form are pointing to a specific branch in an XML document;

FIGS. 19A and 19B, taken together, depict a sequential JavaScript code listing that highlights a specified control appearing in an XML document; and FIG. 20 depicts a JavaScript code listing that highlights the label of a specified control in an XML document.

DETAILED DESCRIPTION OF THE INVENTION

Figure 1:
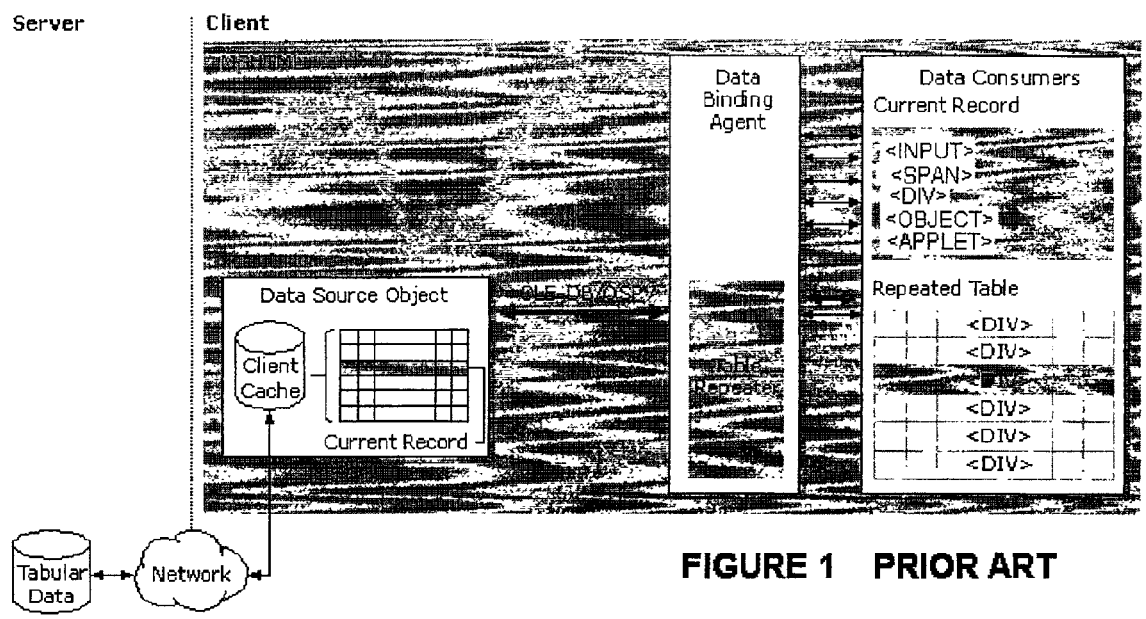
FIG. 1 is a block diagram of a prior art data binding component architecture.
Figure 2:
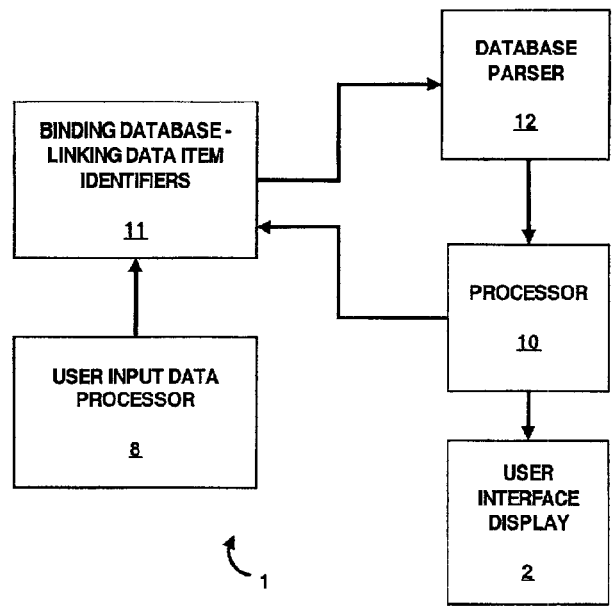
FIG. 2 is a block diagram of a dynamic data binding configuration system constructed according to the principles of the present invention.

FIG. 2 is a block diagram which depicts the processing system 1 of the present invention. The system 1 is implemented in a personal computer which contains software and hardware (not shown) permitting a connection to the internet or other network populated by other computers. Operation of the system begins with a user viewing information displayed on a monitor or other user interface display device 2. Various types of image elements may be visible on the screen 2. The image elements are typically part of a document, form, questionnaire, spreadsheet, web page or browser. Referring to FIG. 3, the display 2 depicts, for example, an HTML form 3 in which the image elements include various prompt elements, e.g. 4, 5, 6, 7, 14, 15, 16 and 17, arranged in a tabular orientation as they would appear on the user display interface 2. As illustrated, these prompt elements may be aligned vertically and/or horizontally. The form 3 includes a prompt element 4 in which a street address may be entered, a prompt element 5 in which a zip code may be entered, a prompt element 6 in which a state may be selected from a drop down or pick list type of menu, and a prompt element 7 in which a city may be entered, and so forth. This information forms a physical or mailing address. Data may be entered into the form 3 by the user and/or may be obtained from the Server machine when the form initially loads onto the computer.

The prompt elements 4, 5, 7, 14, 15 and 16 are a type of prompt element known as a text box, which can display text for a user, and accept textual data from a user. The text box type prompt element is associated with a data item from which it receives its initial data (if any), and into which the data entered by the user is inserted. The prompt elements 6 and 17 are a type of prompt element known as a combo-box. In a combo box, a list of acceptable data entries is presented to the user when the user activates the arrow button at the right side of the prompt element. For example, for prompt element 6, a list of U.S. states is presented to the user when the arrow button is activated. The user can then select one of the acceptable data entries (e.g. one state) from that list. The selected data entry is then displayed in the display area making up the remainder (left hand side) of the prompt element. As before, the combo-box type prompt element may also be preloaded with initial data. The combo-box type prompt element, therefore, requires a source of data to provide the acceptable choices, and a data item from which it receive its initial data (if any), and into which the selected choice is inserted.

The HTML code defining form 3 is stored within the client personal computer, while the data populating the entry fields in the form is ultimately received from and subsequently transferred to other computers, such as a server machine, via the internet connection. FIGS. 10A, 10B, 10C and 10D, when joined together, are an example of an HTML code listing which defines such a form that may be stored on a personal computer. Within the HTML code is JavaScript code (lines 130–131) that will condition the personal computer to obtain data items residing on a Server machine at the time the form loads. Further JavaScript code (lines 132–133) conditions the personal computer to load these data items into an XML document embedded within the HTML document.

When user input data processor 8 (FIG. 2) receives user data intended for form 3 (FIG. 3) from, for example, a keyboard or mouse, the data is processed according to information, stored in a binding database 11, associated with the user input data. For example, referring to FIGS. 4, 6 and 7, the binding database 11 includes a binding table 13, and a first (40) and a second (41) data constraint table. The user input data processor 8 forwards the user data to binding database 11 where it is compared to information in the binding table 13 (FIG. 4) contained within the binding database 11. The binding table 13 in the binding database 11 associates data from the external server with corresponding prompt elements in the form 3 in a manner to be described in more detail below. The received user data is also compared to information in data constraint tables 40 and 41 to determine if the received value of the user input data meets data constraints (i.e. is it within proper range and/or does it coordinate properly with other data) in a manner also to be described in more detail below. If the user input data is within the appropriate constraints, it is forwarded to the processor 10 for subsequent display by the user interface display 2 and possible storage in the associated external data item. Conversely, if the data requires alteration and/or further processing before it may be properly entered in form 3, the processor 10 is conditioned to either perform the proper processing, or to inform the user of the problem via the user interface display 2 and solicit further information from the user via the user input data processor 8 to resolve the problem.

FIG. 4 illustrates a portion of a binding table 13 containing a plurality of entries, illustrated as rows. Each row specifies the linking of a data item with a prompt element. Within the binding table 13 each prompt element 14, 15, 16, and 17 is linked with at least one specified data item received from the server. The first column in binding table 13 identifies a prompt element on the form 3, and the third column identifies the data item from the external server to be linked with that prompt element via one or more data item identifiers 19, 20, 21, 22 and 23, each of which resolves to a set of data items. The second column identifies the type of the prompt element identified in the first column. In most cases there is only one data item identifier linked to each prompt element, and the data item identifier resolves to a set consisting of only one data item. In general, however, the data item can be a simple object property (such as the value of the object), an entire object (containing all of its properties) or an array (repeating group) of objects.

In a preferred embodiment of the present invention Microsoft XSL pattern syntax (previously known as XQL syntax) is used to represent the data item identifier. Microsoft documentation likens XSL Pattern syntax to SQL for use with XML, hence the original name of XQL (XML Query Language). XSL defines a "pattern" syntax which identifies nodes within an XML document. This capability provides the equivalent of an SQL WHERE clause. XSL is further discussed in *Professional XSL* by Kurt Cagle, Michael Corning et al., Wrox Press, Inc. (2001) ISBN 186-100-3579.

The XML data buffer tags (shown without any data entered) associated with the image elements or controls 4, 5, 6 and 7 appearing in form 3 would appear as follows:

```
<Patient>
    <Address>
        <AddressLine1/>
        <AddressLine2/>
        <City/>
        <State/>
        <ZipCode/>
    </Address>...
    <Address>...
    <Address>...
<Patient>
```

In the preceding example the data item identifier /Patient/Address/ZipCode resolves to a data item having one object property: the value of the zip code. The data item identifier /Patient/Address resolves to a data item that is an entire object containing several objects with their own properties (multiple lines of address information, plus City, State and ZipCode), and the data expression /Patient/Address[State=PA], for example, resolves to a data element which is an array composed of a repeating group of objects, i.e. those patients who live in Pennsylvania.

Thus, a data item identifier resolves to a data item or to some portion of data within the embedded XML document containing external data. In XML this reference is to a document node, that is, one branch of the XML document as illustrated, for example in FIG. 11. A data item identifier can represent the data source for a prompt element, the data target (destination) for a prompt element or both.

For example, a combo box needs a data item identifier which will resolve to a list of allowable choices and it also needs a data item identifier which will resolve to a location in the external data where the choice made by the user will be placed:

| | |
|---|---|
| DataSource: | ListOfDoctors |
| DataTarget: | Patient/AttendingDoctor |

Referring specifically to rows 30 and 31 of the binding table 13 (of FIG. 4), these rows both relate to the VIP status combo box 17, identified as prompt element 'ctlVIP' in the first column, and of type 'ComboBox' in the second column. The data item associated with the prompt element 'ctlVIP' 17 in row 30 is the source of the allowable values of the VIP status. In the illustrated embodiment, the allowable values are 'True' and 'False'. However, there is no limit to the number of allowable choices, and for the present example, the allowable values could indicate different levels of VIP status, such as: 'gold level', 'silver level', 'bronze level' and 'none'. This source data item is identified in cell 22 as existing at the location in the embedded XML document: '/AllowableValues/VIPStatuses' which contains a list of the allowable data items. As described above, this list would be retrieved as an array containing the allowable data. The data item linked with the prompt element 'ctlVIP' in row 31 is the destination data item for data entered by the user into the combo-box 17. This destination data item is identified in cell 23 as being at the location '/Patient/VIPStatus'.

Data item identifiers in the binding table 13 can be changed at runtime to allow for dynamic views, that is, to display subsets of available data in the buffer which change based on data entered into other prompt elements.

The data item identifier associated with a prompt element can be stored with that prompt element (i.e., in the XML document defining the form containing that prompt element), with the data (i.e., in the embedded XML document) or separately. In a preferred embodiment of the present invention the most straightforward and flexible way to store the data item identifier information is separately in a data binding table 13, as illustrated in FIG. 4.

In FIG. 10B, the HTML code at line 127 begins the data binding process. The HTML code conditions the client computer to retrieve the external data from the server (line 130–131) via a server XML document, and loads the received external data into an XML document (line 132–133) which is embedded at line 106 into the form. FIGS. 11A and 11B depict the XML code listing for an exemplary XML document such as the XML document referenced at line 106.

Data items in the XML document are bound to prompt elements via JavaScript subroutines depicted in FIGS. 12, 13, 14 and 15. That is, these JavaScript subroutines perform the transfer of data between the data items in the embedded XML document and the associated prompt elements in the form. In order to accomplish this data binding process, the location of the data in the embedded XML document is linked with the prompt element where the data ultimately will be displayed and edited via binding table 13, as described above. The entries in the binding table 13 are defined in the HTML form (FIG. 10A) at lines 120–126. The entries illustrated in FIG. 10 represent only a portion of the binding table entries: those illustrated in FIG. 4. Lines 122–126 insert data into the binding table 13 to map the data items in the embedded XML document to the appropriate prompt elements via an XQL pattern or path that resolves to a node or nodes in the XML document.

The routine listed in FIG. 16 operates in conjunction with the code in the HTML document (FIG. 10) to populate the embedded XML document. This routine inserts data items from the XML document from the external source into the appropriate node in the embedded XML document to which the XQL resolves.

In FIG. 4 the binding table 13 links the XML data item from the embedded XML document, obtained at line 130 of the HTML form (FIG. 10), to the specific prompt elements that appear in the HTML document at lines 122–126. This scheme offers the advantage that more than one prompt element 14, 15, 16, etc. can be mapped in the same binding table 13. In addition, the binding table 13 can be quickly scanned to discern which prompt elements are bound to which data item, a necessary operation in order to refresh the display 2 for prompt elements whose data has changed. To aid in performing this necessary function, the JavaScript subroutine depicted in FIG. 18 determines which prompt elements are bound to a specific branch in the XML document.

Every prompt element (14, 15, 16, and 17) that is linked with a data item (19, 20, 21, 22 and 23) in the binding database 11 has at least one entry in binding table 13. Each prompt element is further associated with a generic binding routine based on the type (24, 25, 26, 27 and 28) of the prompt element. This generic binding routine performs the actual copying of the data between the embedded XML document and the linked prompt element. For example, the generic binding routine associated with prompt element types 24, 25 (InputBox) would be InputBox_XML_UI, where UI refers to the user interface (FIG. 13A, line 320). This generic binding routine transfers textual data between a specified text box prompt element and the data item in the embedded XML document to which it is linked.

Other examples of binding routines applicable to each type of control scenario are shown in FIGS. 12–15. FIG. 12 is an example of the routine which controls the binding the XML data to all of the linked prompt elements in the form. FIG. 13 is a routine which controls the binding of linked XML data to only a specified prompt element. FIG. 14 depicts the binding routine, described above, that will bind the XML data to a relatively simple control such as an input box, while FIG. 15 shows the binding routines for a relatively complex control such as a data list or combobox.

The rows 29, 30, 31 and 32 of binding table 13 (of FIG. 4) are an example of how prompt elements within one presentation group form can be linked with data items located within different object and/or record types. In this case, the four rows 29–32 are associated with three different record types, namely Person/Name 19, 20; Person/Education 21 and Patient 23.

Figure 5:
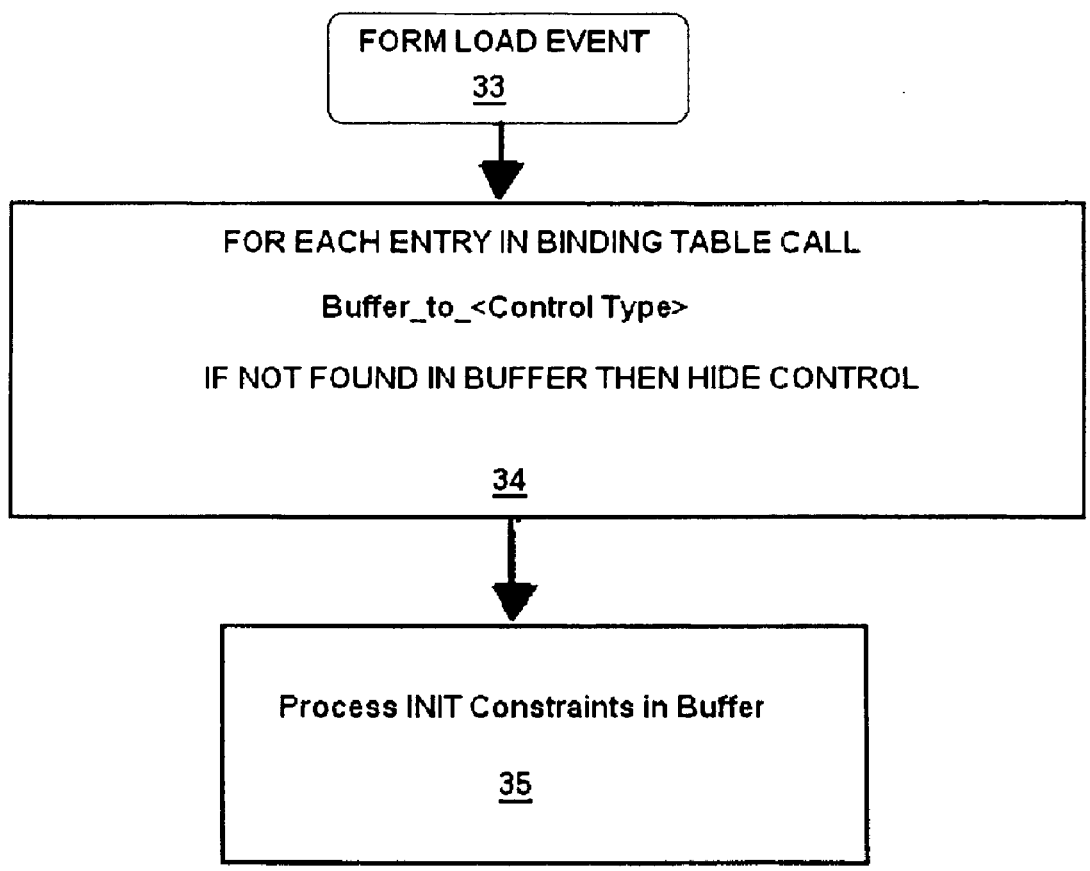
FIG. 5 is a flow chart depicting the initial form load processing steps of the present invention.

Data items are automatically read from the embedded XML document and written to each prompt element (4, 5, 6, 7) in the form 3 when the form 3 is initially loaded. As seen in FIG. 5, the loading of form 3 into the display interface 2 begins with Form Load Event 33. At step 34, the generic Buffer_to_<Control Type> routine is launched for each specific control type appearing in the Binding Table 13. For example, a ComboBox type prompt element would cause initiation (FIG. 13, line 322) of the routine XML_to_ComboBox (FIGS. 15A and 15B). Similarly, an InputBox type prompt element would cause initiation (FIG. 13, line 320) of the routine XML_to_InputBox (FIG. 14).

If the data item to which the prompt element is bound is not found in the embedded XML document, the associated controls are hidden. This feature allows a security layer to remove sensitive data from the embedded XML document or to prevent such data from ever reaching the buffer initially. Further, hiding of the unbound controls prevents the user interface from failing. Furthermore, hiding the control and the prompt for the control prevents the user from realizing that a potentially secure field even exists. When the control is hidden the control still occupies the same physical space on the display 2 so that other controls on the form 3 are not affected.

Following the scan at step 34 for entries in the binding table 13, step 35 processes the buffer initialization constraints appearing in table 40. Certain data constraints are static and can exist as part of the form 3. For example certain prompt elements may be linked to data items that are always required (e.g. 'Patient/Name/familyName' 19 and '/Patient/VIPStatus' 23). Also, certain pick lists (e.g. list of allowable VIP status values 6) can also contain values that do not often change.

In FIG. 6, table 40 depicts an example of data constraints 36 and 37 which are evaluated at the time of form initialization (INIT). When the form 3 initially loads, the constraints listed in "Action" column 38 are performed for any prompt element that maps to the data item identifiers appearing in column 39. In the example shown, the prompt element 17 (ctlVIP) will be marked as required and its associated control pick list will be populated with the values "True" and "False". INIT constraints 36, 37 are processed when the linked data items are initially loaded into the prompt elements. Since INIT constraints 36, 37 do not change after the form is initially opened, these constraints are never again processed.

Prompt elements are activated if their linked data item is relevant and inactivated if their linked data item is not relevant. Furthermore, prompt elements are highlighted if their linked data is marked as required. The routine depicted in FIG. 17 marks as required any prompt elements that are bound to an XML data item marked as being required. The routine shown in FIG. 19 highlights prompt elements marked as required, while FIG. 20 highlights the label (if any) of prompt elements which are marked as required. Similar routines (1) mark prompt elements as not relevant if their linked data item is irrelevant, and inactivate both the prompt element and the label (if any) of any prompt element marked irrelevant; and (2) mark prompt elements as relevant if their linked data item is relevant, and activate both the prompt element and the label (if any) of any prompt element marked relevant. One skilled in the art will understand how to generate code to provide these functions.

Another class of data constraint is extremely dynamic. In this case, the required data constraint is not known until runtime. For example, the allowable values in a pick list might change frequently enough that embedding such values into the form 3 is inappropriate. This includes constraints that may cause a data item to become e.g. either relevant, irrelevant or required as other data items (and the prompt elements with which they are linked) on the form are changed. For example, the data item last_PAP_Test_Date (not illustrated in FIG. 3) is required if the patient gender (also not illustrated in FIG. 3) is FEMALE. Conversely, if the patient gender is MALE then last_PAP_Test_Date is irrelevant and should not be entered. This class of data constraint needs to be evaluated after each data item that is linked with the underlying condition is changed.

For example, as soon as the patient gender is changed to MALE, the data item last_PAP_Test_Date becomes irrelevant and each prompt element that is bound to the last_PAP_Test_Date data item is inactivated. Conversely, as soon as the patient gender is changed to FEMALE, the data item last_PAP_Test_Date becomes relevant and required and each prompt element that is bound to the last_PAP_Test_Date data item is activated and highlighted. In FIG. 7, table 41 depicts an example of data constraints which are dynamically evaluated as data is changed on a form. This type of data constraint is marked in the first column to be evaluated at ONCHANGE time and the data items participating in the condition 45 are listed in column 43. Whenever data is changed on the form, the table 41 is scanned to determine if the changed data item matches any data items listed in column 43. If so, the changed data item must be checked against an associated condition, listed in column 45. If the associated condition is met, the associated actions listed in column 44 are performed.

For example, if /Patient/Sex is the data item that is changed, then both of the entries illustrated in table 41 of FIG. 7 will be triggered, causing their conditions in column 45 to be evaluated. If the condition of column 45 produces a TRUE result, then the corresponding action of column 44 will be performed. Referring specifically to the top row, if the /Patient/Sex changes to "F" (Female) then any prompt element bound to last_PAP_Test_Date (column 42) will be set to "Required". Referring to the second row, if the /Patient/Sex changes to "M" (Male) any prompt element bound to last_PAP_Test_Date will be inactivated. Similar processing may be performed with respect to a combo-box to change the allowable entries based on a change in data in some other prompt element.

As data is entered or changed in any prompt element, the new data is automatically inserted into its associated location in the embedded XML document containing the external data item. More specifically, data input events, such as change and click events, are routed to known generic event handling routines. The generic event handling routines for each prompt element move the data from the prompt element to the embedded XML document. An example of the appropriate instruction is:

<ControlType>_To_Buffer

When data is updated in this manner, the processor 10 detects that the previous version of the updated data item is different from the current version of that data item. The mechanism used to identify such data is to mark that data item as used or "dirty". That is, whenever a user enters new data or updates existing data, that data is marked 'dirty'. This can then be used to assist server processing.

Any data object in the XML document that was originally null (i.e. any XML document node which has no data initially associated with it) is tagged as a placeholder until data is placed into that data object in response to a change in the linked prompt element. Placeholders (new data objects) in the XML document are marked as "Insert" when new data is placed in them. More specifically, once a data object is marked dirty, then that data object is marked as a new object, that is, an object into which data is to be inserted. Any parent (an object containing the new object) placeholder objects are also marked "Insert". Existing objects, i.e. any node already containing data, are marked as "Update" when new data is placed in them. In addition, previous data values can be saved in a list to support "undo" processing.

If a subset of the external data is updated from a source other than the prompt elements, e.g. from a data update from the internet, only those prompt elements that are affected by the changed data are rebound. That is, such partial database updates rebind only the relevant prompt elements. The XML nodes of the data changed are compared to the data item identifiers (19–23) in the binding table 13 and only those prompt elements whose linked data item identifiers fall within the changed data path are updated.

As the user interacts with the prompt elements (4, 5, 6, 7, 14, 15, 16 and 17) of the HTML form 3, the data in at least some of the prompt elements changes. The DHTML browser will initiate events that are directed to the prompt element event handlers, some of which are in the HTML document itself (FIG. 10B, line 137 to FIG. 10D line 190). Some of the event handlers are so generic that they reside in JavaScript files. The prompt element event handlers generally extract the changed data from the prompt element and update the linked node in the XML document. For example, in FIG. 10C (lines 154–164) when the data in the zip code control 5 is changed by the user, line 162 updates the XML document with the new zip code (InputBox_UI_TO_XML (control)).

Optional custom code may be associated with the generic event handlers. For example, additional program code may be invoked by creating event handling functions using a specific naming convention (<controlName>_<eventName>). The generic event handling routines will search at runtime for the existence of additional custom functions and, if found, invoke those functions instead of executing their generic functions. An example of custom logic that may be added before or after data updating is as follows:

```
function ctlZipCode_onchange(aNumericEdit)
{
        // do custom validation here
        if passMyValidation(aNumericEdit) == false
              return; //abort buffer updating
        //otherwise let the system update the XML doc
        this.UI_TO_XML();
}
function ctlZipCode_onafterchange(aNumericEdit)
{
        //custom code here
        DoSomething(); //Verify City and State?
}
```

Figure 8:
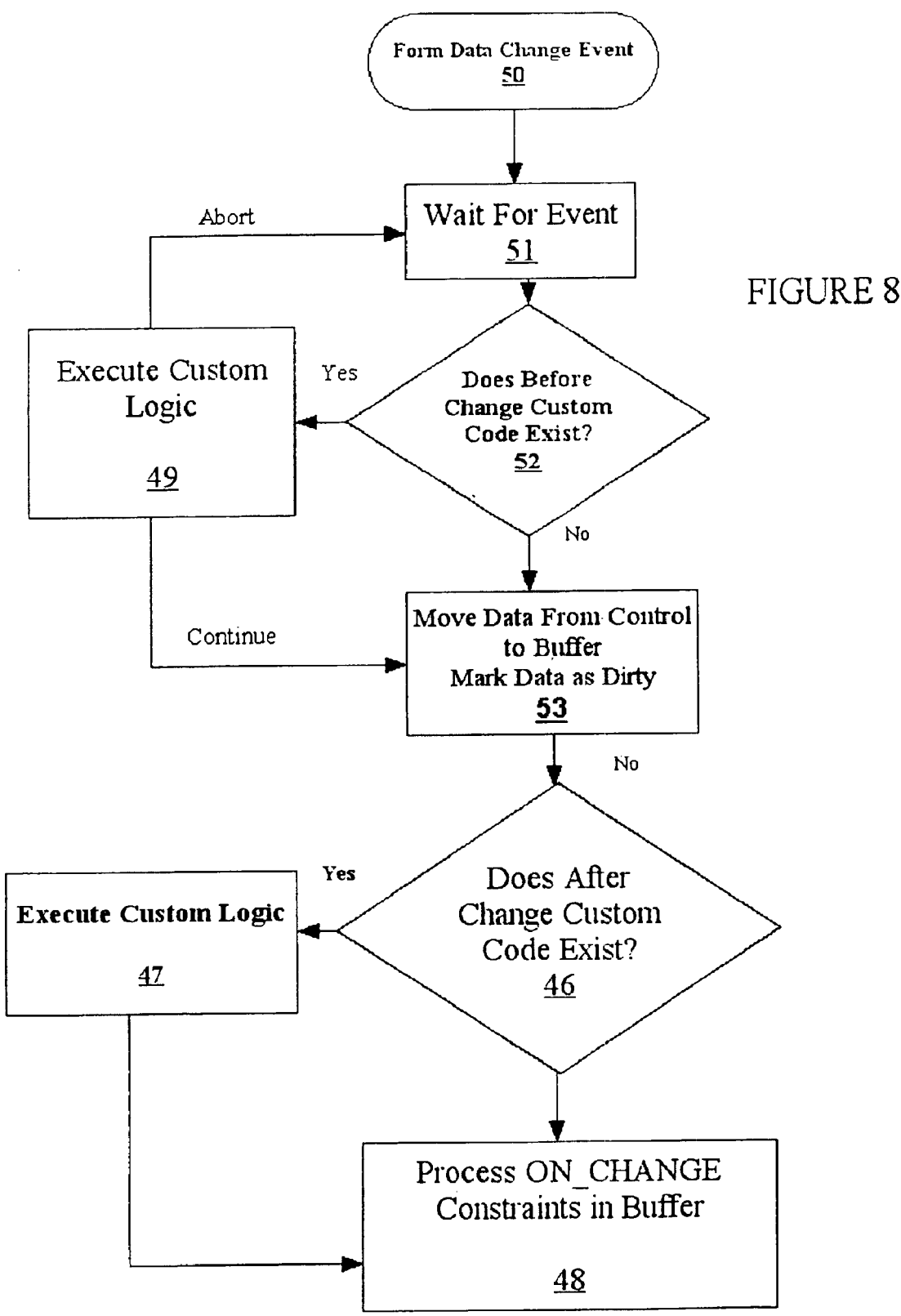
FIG. 8 is a flow chart depicting the processing of a form after form data has been altered.

Referring to FIG. 8, the form data change processing model described above is illustrated. The form data change event handler 50 begins with waiting for a data change event to occur at step 51. At step 52 the subroutine searches for the presence of custom pre-change code before changing the data in the database 11. If such custom code is found to exist, step 49 executes the custom code. If no such custom code is found, the data is moved to the XML document at step 53 using the generic binding routines so that the data may eventually be sent back to the Server machine. After the data change is executed, another search is performed at step 46 for the existence of custom post-change code. If such custom code is found it is executed at step 47. If no such custom code is found, then in the processing at step 48, the ON_CHANGE constraints in the data constraints table 41 of binding database 11 are evaluated and if any are triggered, they are executed. The routine depicted in FIG. 9 is a JavaScript code listing which examines the data runtime for ON_CHANGE validations for the selected control.

The instruction loop depicted in FIG. 8 exists for each prompt element. As seen in FIG. 10, the HTML form data change instructions appear at lines 138–147 for the "street" data, at lines 148–153 for the "address" data, at lines 154–166 for "zip code"data and at lines 178–190 for "city" data.

User written functions 49 can implement custom (more restrictive) validation logic which can cause the data binding to be cancelled (data is not written into the database 11) by simply coding a "return" statement. User written functions 47 can be implemented which are invoked after the data is written to the database 11 in order to cause or perform some post data change task such as data transmission.

What is claimed is:

1. A processing system, for use with a user interface display including image elements for prompting user data entry, comprising:

a binding database, comprising entries for linking different first and second data item identifiers with corresponding different first and second prompt elements of a user interface display image, said first data item identifier identifying a set of allowable data items for entry by a user via said first prompt element;

a database parser for automatically examining said binding database to detect a change in binding database entries altering said set of allowable data items for entry by said user via said first prompt element; and a processor for updating said set of allowable data items for entry by said user via said prompt element in response to said detected binding database change.

2. A system according to claim 1, wherein said second data item identifier identifies a destination data item for accommodating a data item entered via said first prompt element.

3. A system according to claim 1, wherein said binding database comprises a single HTML table.

4. A system according to claim 1, wherein said first and second prompt elements are arranged in tabular orientation in said user interface display.

5. A system according to claim 1, wherein a binding database entry is dynamically variable and is provided to said binding database at least one of (a) prior to display of said user interface and (b) during display of said user interface.

6. A system according to claim 5, wherein said processor identifies a previous version of an updated data item as different from a current version of said data item.

7. A system according to claim 1, wherein said processor identifies a previous version of an updated data item as different from a current version said data item.

8. A method for processing data supporting a user interface display including image elements for prompting user data entry, comprising the activities of:

employing a binding database linking a plurality of data item identifiers with a single prompt element of a user interface display image, said plurality of data item identifiers including first and second data item identifiers; and using said first data item identifier to identify a set of data items comprising items individually selectable for entry by a user via said single prompt element and for using said second data item identifier to identify a destination data item for accommodating data entered via said single prompt element.

9. A method for processing data supporting a user interface display including image elements for prompting user data entry, comprising the activities of:

creating a binding database comprising entries linking different first and second data item identifiers with corresponding different first and second prompt elements of a user interface display image, said first data item identifier identifying a set of allowable data items for entry by a user via said prompt element;

automatically examining said database to detect a change in database entries altering said set of allowable data items for entry by said user via said first prompt element; and updating said set of allowable data items for entry by said user via said prompt element in response to said detected database change.

10. A processing system for use with a user interface display including image elements for prompting user data entry, comprising:

a binding database linking first and second data item identifiers with corresponding first and second prompt elements of a user interface display image; and a processor for using said first data item identifier to identify a destination data record of a first type for accommodating a data item entered via said first prompt element and for using said second data item identifier to identify a destination data record of a different second type for accommodating a data item entered via said second prompt element.

11. A system according to claim 10, wherein said destination data record type identifies a data record accommodating at least one of, (a) personal address data, (b) data representative of a person's name, (c) an individual's status, (d) patient identifier data, (e) a person's physical characteristics.

12. A processing method supporting a user interface display including image elements for prompting user data entry, comprising the activities of:

a binding database linking first and second data item identifiers with corresponding first and second prompt elements of a user interface display image; and using said first data item identifier to identify a destination data record of a first type for accommodating a data item entered via said first prompt element and for using said second data item identifier to identify a destination data record of a different second type for accommodating a data item entered via said second prompt element.

13. A system according to claim 1, wherein said binding database includes an entry linking a resolvable expression with a user entered item selected from said set of allowable data items via a prompt element.

14. A system according to claim 13, including a data processor for applying said resolvable expression to said user entered item to calculate a value.

15. A system according to claim 1, wherein said set of allowable data items for entry by said user via said first prompt element are user non-specific.

16. A system according to claim 8, including the activity of linking a data item identifier, of said plurality of data item identifiers and identifying a data item entered via said single prompt element, with a resolvable expression.

17. A system according to claim 16, including the activity of applying said resolvable expression to said user entered item to calculate a value.

18. A system according to claim 8, wherein said set of data items comprising items individually selectable for entry by a user via said single prompt are user non-specific.

19. A system according to claim 1, wherein said first and second data item identifiers are stored together with data representing said corresponding different first and second prompt elements in an HTML file representing said user interface display including image elements.

* * * * *